United States Patent
Seidel et al.

(10) Patent No.: US 11,912,571 B2
(45) Date of Patent: Feb. 27, 2024

(54) DEVICE AND PROCESS FOR PRODUCING HYDROGEN PEROXIDE BY AN ANTHRAQUINONE PROCESS

(71) Applicant: EVONIK OPERATIONS GMBH, Essen (DE)

(72) Inventors: Nils Henning Seidel, Frankfurt (DE); Johannes Kamp, Frankfurt (DE); Jürgen Glenneberg, Offenbach (DE); Christian Panz, Wesseling-Berzdorf (DE); Eduardo Federico Arévalo Saade, Erlensee (DE); Hari Prasad Mangalapally, Hanau-Grossauheim (DE)

(73) Assignee: Evonik Operations GmbH, Essen (DE)

(*) Notice: Subject to any disclaimer, the term of this patent is extended or adjusted under 35 U.S.C. 154(b) by 311 days.

(21) Appl. No.: 17/331,593

(22) Filed: May 26, 2021

(65) Prior Publication Data
US 2021/0371281 A1 Dec. 2, 2021

(30) Foreign Application Priority Data
May 28, 2020 (EP) .................................. 20177047

(51) Int. Cl.
*C01B 15/023* (2006.01)
*B01D 3/40* (2006.01)

(52) U.S. Cl.
CPC .............. *C01B 15/023* (2013.01); *B01D 3/40* (2013.01); *C01P 2006/82* (2013.01)

(58) Field of Classification Search
CPC ................................ C01B 15/023; B01D 3/40
See application file for complete search history.

(56) References Cited

U.S. PATENT DOCUMENTS

| | | | |
|---|---|---|---|
| 4,485,084 A | 11/1984 | McIntyre | |
| 5,171,407 A | 12/1992 | Meili | |
| 5,964,986 A | 10/1999 | Meili | |
| 6,153,169 A | 11/2000 | Glenneberg et al. | |
| 6,355,815 B1 | 3/2002 | Glenneberg et al. | |
| 6,447,744 B1* | 9/2002 | Haas | C01B 15/023 423/588 |
| 6,982,072 B2 | 1/2006 | Maurer | |
| 7,195,748 B2* | 3/2007 | Jaeger | C01B 15/023 423/588 |
| 7,238,335 B2* | 7/2007 | Goor | C01B 15/023 423/588 |
| 7,722,847 B2 | 5/2010 | Haas et al. | |
| 7,981,391 B2 | 7/2011 | Haas et al. | |
| 9,206,047 B2 | 12/2015 | Eickoff et al. | |
| 2001/0028873 A1 | 10/2001 | Haas et al. | |
| 2002/0141935 A1 | 10/2002 | Haas et al. | |

FOREIGN PATENT DOCUMENTS

| | | |
|---|---|---|
| WO | WO 2008/002255 | 1/2008 |
| WO | WO 2010/139728 | 12/2010 |

OTHER PUBLICATIONS

European Search Report and Search Opinion for corresponding European application EP 20177047 filed May 28, 2020.
Goor, et.al., "Hydrogen Peroxide," Ulmann's Encylopedia of Industrial Chemistry vol. 18, pp. 393-427 (Apr. 2007).
Pekkanen, "Concentration of Hydrogen Peroxide and Improving it's Energy Efficiency," Master's Degree Program in Chemical and Process Engineering, Lappeenranta University of Technology, pp. 1-109 (Jan. 2014).

* cited by examiner

*Primary Examiner* — Sikarl A Witherspoon
(74) *Attorney, Agent, or Firm* — Law Office of Michael A. Sanzo, LLC

(57) ABSTRACT

In a cyclic anthraquinone process for producing hydrogen peroxide, which comprises a distillation unit with vapor compression for concentrating hydrogen peroxide, aqueous condensate from the distillation unit is passed over a bed of a cation exchange resin in its protonated from to provide a purified condensate, and the purified condensate is used as extractant for extracting hydrogen peroxide in the anthraquinone process, as column reflux for the distillation unit or as a diluent for diluting an aqueous hydrogen peroxide solution.

20 Claims, 1 Drawing Sheet

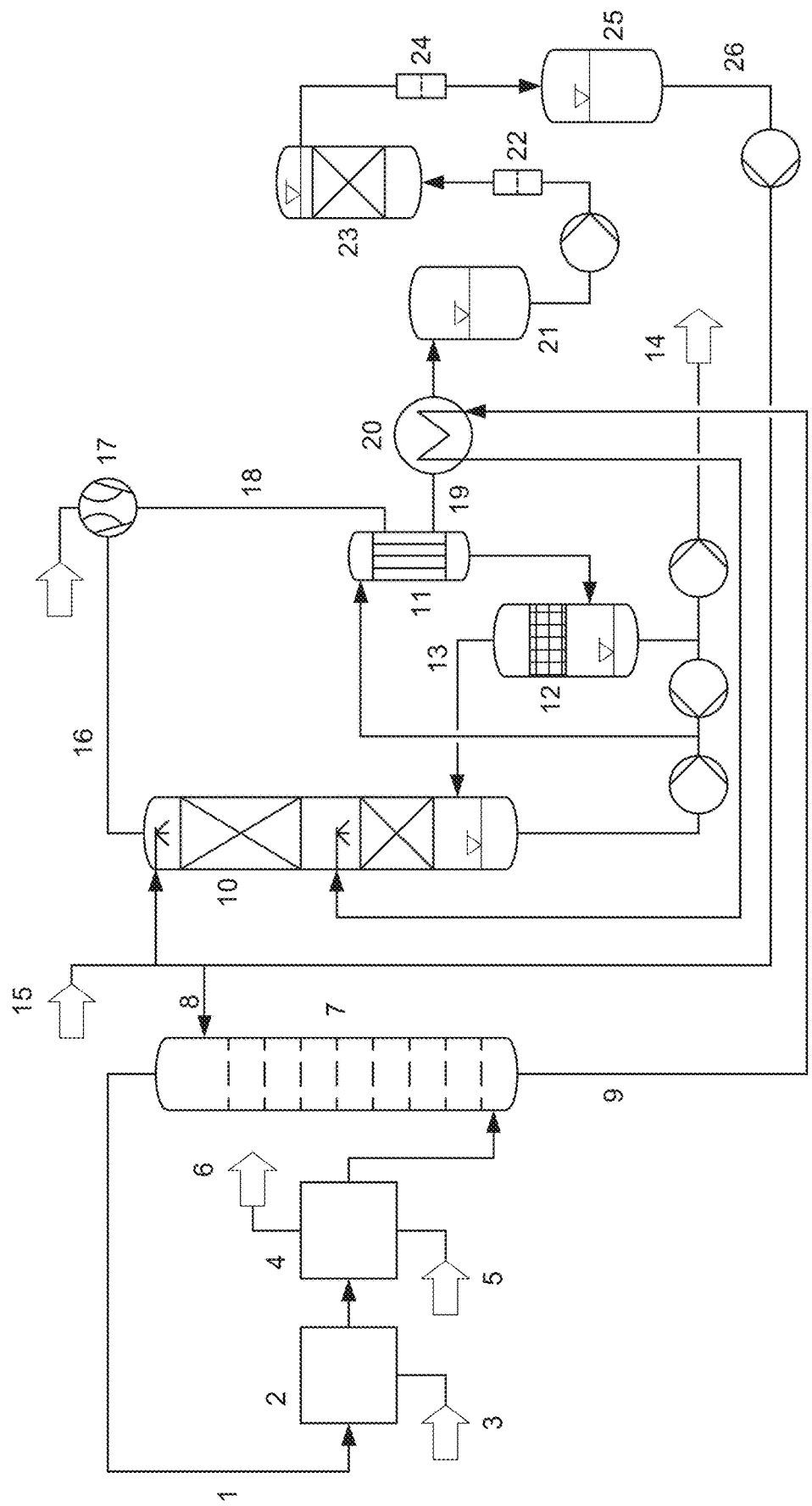

DEVICE AND PROCESS FOR PRODUCING HYDROGEN PEROXIDE BY AN ANTHRAQUINONE PROCESS

CROSS REFERENCE TO RELATED APPLICATIONS

The present application claims priority under 35 USC § 119 to application EP 20177047.6, filed in Europe on May 28, 2020, the contents of which is incorporated herein by reference in its entirety.

FIELD OF THE INVENTION

The invention relates to a device and to a process for producing hydrogen peroxide by an anthraquinone process which produce aqueous solutions of hydrogen peroxide with low energy consumption, low consumption of deionized water, and lower extent of waste water.

BACKGROUND OF THE INVENTION

The most important process for producing hydrogen peroxide on an industrial scale is the anthraquinone process, which generates hydrogen peroxide by hydrogenating a working solution of an alkylanthraquinone or an alkyltetrahydroanthraquinone in a water immiscible solvent and oxidizing the hydrogenated solution with molecular oxygen, usually with air. The hydrogen peroxide is then extracted with water from the working solution and the working solution is reused for generating hydrogen peroxide. An overview of the anthraquinone process is given in Ullmann's Encyclopedia of Industrial Chemistry, online edition, entry "Hydrogen Peroxide", pages 5-21, DOI 10.1002/14356007.a13_443.pub3, and in particular in FIG. 5 on page 11.

For safety reasons, the extraction of hydrogen peroxide from the working solution is usually carried out to concentrations of up to 40% by weight. The aqueous hydrogen peroxide solution obtained by extraction is then usually concentrated to 45 to 70% by weight by evaporating water at reduced pressure in order to reduce its volume and weight for transport. Condensate from this evaporation step can be reused in the extraction.

EP 419 406 A1 and WO 2012/025333 disclose devices and processes for concentrating hydrogen peroxide, which comprise a vapor compressor and heating of an evaporator with the condensation heat of the compressed vapors in order to reduce the amount of energy needed for concentrating the hydrogen peroxide.

SUMMARY OF THE INVENTION

The inventors of the present invention have now found that recycling a condensate, obtained from a step of concentrating hydrogen peroxide with vapor compression, to the extraction step of an anthraquinone process can lead to increased decomposition of hydrogen peroxide in the extraction step of the anthraquinone process as well as to a hydrogen peroxide product having insufficient storage stability, in particular when a steam driven ejector is used for vapor compression. This leads to discharging the condensate from vapor compression to waste water treatment because it may contain impurities such as dissolved iron and other metal ions. The inventors of the present invention have further found that such problems with increased hydrogen peroxide decomposition can be prevented by purifying the condensate with a cation exchange resin in its protonated form. This purified condensate from vapor compression containing a low content of hydrogen peroxide could be used as inlet for the extraction step, recycled to a distillation column used for concentrating hydrogen peroxide or recycled to a step of diluting an aqueous hydrogen peroxide solution. Thus, waste water treatment and deionized water consumption can be saved. The purified condensed vapor containing a low content of hydrogen peroxide can be recycled instead of feeding the unpurified condensate to the waste water treatment. A lower extent of vapor condensate sent to waste water treatment leads to a lower content of hydrogen peroxide in the waste water. This avoids in turn the potential inhibition of biological activity caused by hydrogen peroxide within the waste water treatment.

Subject of the invention is therefore a device for producing hydrogen peroxide by an anthraquinone process, comprising a) a hydrogenator for hydrogenating a working solution comprising an alkylanthraquinone and/or an alkyltetrahydroanthraquinone and at least one water immiscible solvent for said alkylanthraquinone and/or alkyltetrahydroanthraquinone with a gas comprising molecular hydrogen in the presence of a hydrogenation catalyst to provide a hydrogenated working solution;

b) an oxidizer for oxidizing hydrogenated working solution with a gas comprising molecular oxygen to provide an oxidized working solution containing dissolved hydrogen peroxide, said oxidizer being connected to said hydrogenator to receive hydrogenated working solution;

c) an extractor for extracting hydrogen peroxide with an aqueous extractant from oxidized working solution containing dissolved hydrogen peroxide to provide a dilute aqueous hydrogen peroxide solution, said extractor being connected to said oxidizer to receive oxidized working solution containing dissolved hydrogen peroxide;

d) a distillation unit for concentrating an aqueous hydrogen peroxide solution to provide a concentrated aqueous hydrogen peroxide solution and an aqueous condensate, said distillation unit comprising a hydrogen peroxide evaporator, a distillation column receiving vapor from said hydrogen peroxide evaporator and a vapor compressor receiving overhead vapor from said distillation column and passing compressed vapor as heating medium to said hydrogen peroxide evaporator, said distillation unit being connected to said extractor to receive said dilute aqueous hydrogen peroxide solution; and e) a purification unit comprising a bed of a cation exchange resin in its protonated form for purifying said aqueous condensate to provide a purified condensate, said purification unit being connected to said distillation unit to receive said aqueous condensate as feed and being connected to (i) said extractor, passing purified condensate as aqueous extractant to said extractor, or (ii) said distillation unit, passing purified condensate as a column reflux to said distillation column, or (iii) a hydrogen peroxide dilution device, passing purified condensate as diluent to the hydrogen peroxide dilution device, or (iv) any combination of (i) to (iii).

Subject of the invention is also a process for producing hydrogen peroxide by an anthraquinone process, comprising the steps of a) hydrogenating a working solution comprising an alkylanthraquinone and/or an alkyltetrahydroanthraquinone and at least one solvent for said alkylanthraquinone and/or alkyltetrahydroanthraquinone with a gas comprising molecular hydrogen in the presence of a hydrogenation catalyst to provide a hydrogenated working solution, b) oxidizing hydrogenated working solution of step a) with a gas comprising molecular oxygen to provide an oxidized working solution containing dissolved hydrogen peroxide, c) extracting hydrogen peroxide from oxidized working solution of step b) with an aqueous extractant to provide a dilute aqueous hydrogen peroxide solution containing from 25 to 50% by weight hydrogen peroxide, d) concentrating dilute aqueous hydrogen peroxide solution of step c) in a distillation unit comprising a hydrogen peroxide evaporator, a distillation column receiving vapor from the hydrogen peroxide evaporator and a vapor compressor receiving overhead vapor from the distillation column and passing compressed vapor as heating medium to the hydrogen peroxide evaporator, to provide a concentrated aqueous hydrogen peroxide solution, containing from 45 to 90% by weight hydrogen peroxide, and an aqueous condensate, e) purifying aqueous condensate of step d) in a purification unit by passing it through a bed of a cation exchange resin in its protonated form to provide a purified condensate, and f) reusing purified condensate of step e) as (i) an aqueous extractant in extracting step c), (ii) a column reflux for the distillation column in concentrating step d), (iii) a diluent in a step of diluting an aqueous hydrogen peroxide solution, or (iv) in any combination of (i) to (iii).

The vapor compressor of the distillation unit is preferably a steam driven ejector.

BRIEF DESCRIPTION OF DRAWINGS

The FIGURE shows a preferred embodiment where a steam ejector is used as vapor compressor, a falling film evaporator is used as hydrogen peroxide evaporator, a counter-current extraction column is used for extracting hydrogen peroxide and purified condensate is used as aqueous extractant in the extracting step.

DETAILED DESCRIPTION OF THE INVENTION

In the process of the invention, hydrogen peroxide is produced by an anthraquinone process.

The anthraquinone process uses a working solution comprising at one or more 2-alkylanthraquinones, 2-alkyltetrahydroanthraquinones or mixtures of both 2-alkylanthraquinones and 2-alkyltetrahydroanthraquinones, referred to as quinones in the following, and at least one solvent for dissolving the quinone(s) and the hydroquinone(s). The 2-alkylanthraquinone is preferably 2-ethylanthraquinone (EAQ), 2-amylanthraquinone (AAQ) or 2-(4-methylpentyl)-anthraquinone IHAQ and more preferably a mixture of EAQ with AAQ and/or IHAQ where the molar fraction of quinones carrying an ethyl group is from 0.05 to 0.95. The working solution preferably comprises both 2-alkylanthraquinones and the corresponding 2-alkyltetrahydroanthraquinones and the ratio of 2-alkyltetrahydroanthraquinones plus 2-alkyltetrahydroanthrahydroquinones to 2-alkylanthraquinones plus 2-alkylanthrahydroquinones is preferably maintained in the range of from 1 to 20 by adjusting the conditions of the hydrogenating and regenerating steps used in the anthraquinone process. The working solution preferably comprises a mixture of alkylbenzenes having 9 or 10 carbon atoms as solvent for anthraquinones and at least one polar solvent selected from diisobutylcarbinol (DiBC), methylcyclohexylacetate (MCA), trioctylphosphate (TOP), tetrabutylurea (TBU) and N-octylcaprolactam as solvent for anthrahydroquinones, DiBC, MCA and TOP being preferred and TOP being most preferred.

The anthraquinone process is a cyclic process, comprising a step a) of hydrogenating working solution with hydrogen, a step b) of oxidizing hydrogenated working solution of step a) with molecular oxygen, and a step c) of extracting hydrogen peroxide from oxidized working solution of step b), with the extracted working solution of step c) being returned to hydrogenating step a) to complete a reaction cycle.

In step a), the working solution comprising an alkylanthraquinone and/or an alkyltetrahydroanthraquinone and at least one solvent for said alkylanthraquinone and/or alkyltetrahydroanthraquinone is hydrogenated with a gas comprising molecular hydrogen in the presence of a hydrogenation catalyst to provide a hydrogenated working solution.

In this hydrogenation step, all or a part of the quinones are converted to the corresponding hydroquinones. All hydrogenation catalysts known from the prior art for the anthraquinone cyclic process can be used as catalysts in the hydrogenation stage. Noble metal catalysts containing palladium as the principal component are preferred. The catalysts can be used as a fixed bed catalyst or as a suspended catalyst and suspended catalysts can be either unsupported catalysts, such as palladium black, or supported catalysts, with suspended supported catalysts being preferred. $SiO_2$, $TiO_2$, $Al_2O_3$ and mixed oxides thereof, as well as zeolites, $BaSO_4$ or polysiloxanes, are can be used as support materials for fixed-bed catalysts or supported suspended catalysts, with $Al_2O_3$ and sodium aluminum silicate being preferred. Catalysts in the form of monolithic or honeycombed moldings, the surface of which is coated with the noble metal, can also be used. Hydrogenation can be carried out in bubble column reactors, stirred-tank reactors, tube reactors, fixed-bed reactors, loop reactors or gas-lift reactors which can be equipped with devices for distributing hydrogen gas in the working solution, such as static mixers or injection nozzles. Preferably, a bubble column with a recycle and injection of hydrogen gas at the column bottom is used, such as described in WO 2010/139728 and in Ullmann's Encyclopedia of Industrial Chemistry, online edition, entry "Hydrogen Peroxide", DOI: 10.1002/14356007.a13_443.pub3, pages 13-14 and FIG. 8. Hydrogenation is preferably carried out at a temperature of from 20 to 100° C., more preferably 45 to 75° C., and a pressure of from 0.1 MPa to 1 MPa, more preferably 0.2 MPa to 0.5 MPa. The hydrogenation is preferably performed in such a way that most of the hydrogen introduced into the hydrogenation reactor, preferably more than 90%, is consumed in a single pass through the reactor. The ratio between hydrogen and working solution fed to the hydrogenation reactor is preferably chosen to convert between 30 and 80% of the quinones to the corresponding hydroquinones. If a mixture of 2-alkylanthraquinones and 2-alkyltetrahydroanthraquinones is used, the ratio between hydrogen and working solution is preferably chosen so that only the 2-alkyltetrahydroanthraquinones are converted to hydroquinones and the 2-alkylanthraquinones remain in the quinone form.

In step b), the hydrogenated working solution of step a) is oxidized with a gas comprising molecular oxygen to provide an oxidized working solution containing dissolved hydrogen peroxide In this oxidation step, the hydrogenated working solution from step a) is reacted with an oxygen-containing gas, preferably with air or with oxygen enriched air. All oxidation reactors known from the prior art for the anthraquinone process can be used for the oxidation, bubble columns operated in counter-current being preferred. The bubble column can be free from internal devices, but preferably contains distribution devices in the form of packings or sieve plates, most preferably sieve plates in combination with internal coolers. Oxidation is preferably carried out at a temperature of from 30 to 70° C., more preferably from 40 to 60° C. Oxidation is preferably performed with an excess of oxygen to convert more than 90%, preferably more than 95%, of the hydroquinones to the quinone form.

In step c), hydrogen peroxide is extracted from oxidized working solution of step b) with an aqueous extractant to provide a dilute aqueous hydrogen peroxide solution containing from 25 to 50% by weight hydrogen peroxide, preferably from 25 to 49% by weight hydrogen peroxide.

In this extraction step, the oxidized working solution of step b) containing dissolved hydrogen peroxide is extracted with an aqueous extractant to provide an aqueous hydrogen peroxide solution and an extracted oxidized working solution containing essentially no hydrogen peroxide. Deionized water, which may optionally contain additives for stabilizing hydrogen peroxide, for adjusting the pH and/or for corrosion protection, is preferably used for extracting the hydrogen peroxide. Preferably, phosphoric acid is added for adjusting the pH and for corrosion protection, Extraction is preferably carried out in a counter-current continuous extraction column, sieve-plate columns being most preferred. The aqueous hydrogen peroxide solution obtained by extraction may also be purified for removing working solution components, preferably by washing with a solvent, which is preferably a solvent comprised in the working solution.

The extracted working solution of step c) is preferably dried before it is recycled to hydrogenating step a). Drying of the extracted working solution is preferably carried out by evaporating water from the working solution at a temperature of from 30 to 110° C., preferably 40 to 75° C. and a pressure of from 10 to 300 mbar, preferably 20 to 100 mbar. Such drying of extracted working solution at reduced pressure is preferably carried out as described in WO 03/070632 on page 8, line 24 to page 8, line 3.

In step d) of the process of the invention, the dilute aqueous hydrogen peroxide solution obtained in step c) is concentrated in a distillation unit to provide a concentrated aqueous hydrogen peroxide solution, containing from 45 to 90% by weight hydrogen peroxide, preferably from 50 to 90% by weight hydrogen peroxide, and an aqueous condensate. The hydrogen peroxide is concentrated at reduced pressure, preferably at a pressure of from 60 to 130 mbar, to prevent formation of explosive hydrogen peroxide vapors in the distillation unit. The distillation unit comprises a hydrogen peroxide evaporator, a distillation column receiving vapor from the hydrogen peroxide evaporator, and a vapor compressor receiving all or a part of the overhead vapor from the distillation column and passing compressed vapor as heating medium to the hydrogen peroxide evaporator. A thermosiphon evaporator passing a two-phase mixture of vapor and liquid directly to the distillation column may be used as hydrogen peroxide evaporator. Preferably, a falling film evaporator is used, and the two-phase mixture of vapor and liquid generated in the evaporator is passed to a separation vessel from which separated vapor is passed to the distillation column. The separation vessel preferably comprises a demister which horizontally partitions the separation vessel. The two-phase mixture of vapor and liquid generated in the evaporator is then introduced below the demister and the outlet for vapor to be passed to the distillation column is arranged above the demister to remove droplets from the vapor separated in the separation vessel. The liquid separated in the separation vessel is preferably recycled to the falling film evaporator. The concentrated aqueous hydrogen peroxide may be withdrawn from the distillation column bottom or preferably from the liquid phase generated in the evaporator. When only a part of the overhead vapor from the distillation column is compressed, the remaining non-compressed overhead vapor is condensed in a condenser. The aqueous condensate is obtained by condensation of the compressed vapor or by condensation of both the compressed vapor and the non-compressed overhead vapor. In a preferred embodiment, aqueous condensate is passed through a heat exchanger to transfer heat to the stream of dilute aqueous hydrogen peroxide solution which is passed to the distillation column. Suitable distillation units for concentrating the dilute aqueous hydrogen peroxide solution are known from the prior art. Preferred distillation units are disclosed in WO 2012/025333, in particular in FIGS. 1 and 2 of this document. Suitable is also the distillation unit of U.S. Pat. No. 5,171,407, when equipped with a vapor compressor as shown in FIG. 4 of this document.

Preferably, a steam driven ejector is used as vapor compressor in step d). In this case, the aqueous condensate contains water evaporated from the dilute aqueous hydrogen peroxide solution and condensed motive steam from the steam driven ejector. The ejector may also be used for reducing the pressure in the distillation column to the desired level.

In step e) of the process of the invention, all or a part of the aqueous condensate obtained in step d) is purified in a purification unit by passing it through a bed of a cation exchange resin in its protonated form to provide a purified condensate. The aqueous condensate is preferably filtered before passing it over the cation exchange resin bed to prevent particulate impurities such as metal particles from entering the cation exchange resin bed. The aqueous condensate is preferably passed through the cation exchange resin bed in upward flow, preferably at a temperature of from 0 to 90° C. The cation exchange resin can be both a gel type resin or a macroporous resin and is preferably a strongly acidic cation exchange resin containing sulfonic acid groups. Most preferred are macroporous sulfonated cross-linked polystyrene cation exchange resins. Suitable cation exchange resins shaped as spherical particles are commercially available. In a preferred embodiment, the purified condensate leaving the bed of a cation exchange resin is also filtered to prevent accidentally carrying resin particles into the extraction column or the distillation column.

The bed of a cation exchange resin may be regenerated from time to time by passing an aqueous solution of a strong acid through the bed in order to exchange metal or ammonium ions for protons. However, in a preferred embodiment, the bed of cation exchange resin is not regenerated but replaced by fresh resin when the concentration of iron, nickel or chromium in the purified condensate increases to a value of more than 0.02 mg/l. Replacing loaded resin instead of regenerating it prevents accumulation of insoluble deposits of iron(III) compounds on the resin as well as long term resin degradation resulting from resin oxidation by hydrogen peroxide contained in the aqueous condensate.

In step f) of the process of the invention, all or a part of the purified condensate of step e) is reused. The purified condensate of step e) can be reused as an aqueous extractant in extracting step c). This reduces the amount of deionized water needed for extracting hydrogen peroxide from the working solution. Alternatively, or in addition, a part of the purified condensate of step e) can be reused as column reflux for the distillation column in concentrating step d). In another alternative, a part of the purified condensate of step e) is used as a diluent in a step of diluting an aqueous hydrogen peroxide solution. All three alternatives of reuse may be employed at the same time or alternatingly. In a preferred embodiment, part of the purified condensate is passed to the top of the distillation column of step d) to provide a column reflux and the remainder is preferably passed to extracting step c) for use as an aqueous extractant.

The process of the invention prevents introduction of transition metal ions into the hydrogen peroxide product when condensate from the step of concentrating hydrogen peroxide is reused in a manner which introduces condensate into the hydrogen peroxide product. This allows to save use of deionized water in the production of hydrogen peroxide and at the same time provides good stability of the hydrogen peroxide product with low amounts of added stabilizers.

The process of the invention is particularly advantageous when a steam driven ejector is used as vapor compressor in step d), because the steam used for driving the ejector may contain iron salt or rust particles originating from the steam generator or from carbon steel steam conduits and step e) of purifying the condensate can prevent carry-over of such impurities into process stages where they may increase the content of iron in the hydrogen peroxide product.

The process of the invention preferably comprises at least one additional step of regenerating the working solution, where by-products formed in the process are converted back to quinones. Regeneration is carried out by withdrawing hydrogenated working solution between steps a) and b) and treating it with alumina and/or sodium hydroxide, preferably using a side stream to the cyclic process which is continuously or periodically subjected to regeneration. In addition to regeneration of hydrogenated working solution, extracted oxidized working solution may be withdrawn after step c) and regenerated in a side stream using alumina, sodium hydroxide or an organic amine. Suitable methods for regenerating the working solution of an anthraquinone process are known from the prior art.

The process of the invention is preferably carried out in the device of the invention which comprises a hydrogenator for hydrogenating a working solution with a gas comprising molecular hydrogen in the presence of a hydrogenation catalyst; an oxidizer for oxidizing hydrogenated working solution with a gas comprising molecular oxygen, the oxidizer being connected to said hydrogenator to receive hydrogenated working solution; an extractor for extracting hydrogen peroxide with an aqueous extractant from oxidized working solution, the extractor being connected to the oxidizer to receive oxidized working solution; a distillation unit for concentrating aqueous hydrogen peroxide solution to provide a concentrated aqueous hydrogen peroxide solution and an aqueous condensate, the distillation unit comprising a hydrogen peroxide evaporator, a distillation column receiving vapor from the hydrogen peroxide evaporator and a vapor compressor receiving overhead vapor from the distillation column and passing compressed vapor as heating medium to the hydrogen peroxide evaporator, the distillation unit being connected to the extractor to receive aqueous hydrogen peroxide solution provided by the extractor; and a purification unit comprising a bed of a cation exchange resin in its protonated form for purifying the aqueous condensate to provide a purified condensate, the purification unit being connected to the distillation unit to receive the aqueous condensate as feed. The purification unit is connected to (i) the extractor, passing purified condensate as aqueous extractant to the extractor, or to (ii) the distillation unit, passing purified condensate as a column reflux to the distillation column, or to (iii) a hydrogen peroxide dilution device, passing purified condensate as diluent to the hydrogen peroxide dilution device or to any combination of apparatuses (i) to (iii). The purification unit is preferably connected to both the extractor and the distillation unit to allow for passing a part of the purified condensate as column reflux to the distillation column and passing the remainder as aqueous extractant to the extractor.

The device of the invention preferably comprises a working solution as described further above for the process of the invention.

The hydrogenator a) of the device of the invention may be of any type known from the prior art for hydrogenating a working solution comprising an alkylanthraquinone, an alkyltetrahydroanthraquinone or both. The hydrogenator may comprise a bubble column reactor, a stirred-tank reactor, a tube reactor, a fixed-bed reactor, a loop reactor or a gas-lift reactor for carrying out the hydrogenation reaction, depending on whether a suspended hydrogenation catalyst or a fixed bed hydrogenation catalyst shall be used. The hydrogenator preferably comprises a bubble column with a recycle and injection of hydrogen gas at the column bottom for use with a suspended catalyst as known from WO 2010/139728 and Ullmann's Encyclopedia of Industrial Chemistry, online edition, entry "Hydrogen Peroxide", DOI: 10.1002/14356007.a13_443.pub3, pages 13-14 and FIG. 8. The hydrogenator preferably comprises a heat exchanger for removing the heat of reaction from the working solution, preferably a heat exchanger arranged inside the hydrogenation reactor. When a suspended hydrogenation catalyst shall be used, the hydrogenator typically also comprises a separator for separating catalyst from the working solution and returning it to the hydrogenation reactor, such as a filter, preferably a cross-flow filter. The hydrogenator preferably also comprise a hydrogen compressor for carrying out hydrogenation at a pressure higher than the pressure provided by the source of the hydrogen feed. The hydrogenator may further comprise a separator for separating non-reacted hydrogen gas from the hydrogenated working solution and recycling it to the hydrogenation reactor.

The oxidizer b) of the device of the invention may be of any type known from the prior art for oxidizing a hydrogenated working solution comprising an alkylanthrahydroquinone, an alkyltetrahydroanthrahydroquinone or both. The oxidizer typically comprises an oxidation reactor and a gas compressor for introducing a compressed gas comprising molecular oxygen, such as compressed air, into the oxidation reactor. Preferably, a bubble column, which is preferably operated in counter-current, is used as oxidation reactor. The bubble column can be free from internal devices, but preferably contains distribution devices in the form of packings or sieve plates, most preferably sieve plates in combination with internal heat exchangers. The oxidizer may further comprise a unit for recovering mechanical energy from off-gas leaving the oxidation reactor, such as a turboexpander as described in U.S. Pat. No. 4,485,084 or a gas jet pump as described in WO 03/070632.

The extractor c) of the device of the invention may be of any type known from the prior art for extracting hydrogen peroxide with an aqueous extractant from oxidized working solution containing dissolved hydrogen peroxide. The extractor preferably comprises an extraction column, more preferably a counter-current continuous extraction column, sieve-plate columns being most preferred. The extractor may also comprise a coalescer nit for separating dispersed droplets of working solution from the aqueous hydrogen peroxide solution obtained by extraction, a coalescer unit for separating dispersed water droplets from extracted working solution, or both types of coalescer units. The extractor may further comprise a unit for purifying the aqueous hydrogen peroxide solution obtained by extraction by removing working solution components, preferably a unit for washing the aqueous hydrogen peroxide solution with a solvent.

The distillation unit d) of the device of the invention comprises a hydrogen peroxide evaporator, a distillation column receiving vapor from the peroxide evaporator and a vapor compressor receiving overhead vapor from the distillation column and passing compressed vapor as heating medium to the hydrogen peroxide evaporator. Any type of hydrogen peroxide evaporator and distillation column known from the prior art for concentrating an aqueous hydrogen peroxide solution may be used. The hydrogen peroxide evaporator may be the distillation bottoms evaporator, which may be arranged separately from the distillation column or may be integrated into the distillation column, for example as disclosed in EP 0 419 406 A1, FIG. 4 or in EP 0 835 680 A1, FIGS. 1 and 2. A separate thermosiphon evaporator passing a two-phase mixture of vapor and liquid to the distillation column may be used as distillation bottoms evaporator. Preferably, a separate falling film evaporator passing vapor and to the distillation column with recycling of non-evaporated liquid to the falling film evaporator is used as distillation bottoms evaporator. More preferably, the distillation unit comprises a falling film evaporator, a separation vessel horizontally partitioned by a demister, connected below the demister to the falling film evaporator to receive the vapor-liquid mixture provided by the evaporator, a conduit connected to the separation vessel above the demister for passing vapor to the distillation column, and a recycle conduit for recycling liquid from the bottom of the separation vessel to the falling film evaporator. Suitable demisters for removing aqueous droplets from a vapor phase are known from the prior art, such as packings, meshes or nets made from metal or a polymer. The distillation unit may also comprise both a hydrogen peroxide feed evaporator and a distillation bottoms evaporator, with compressed vapor being passed to the hydrogen peroxide feed evaporator, for example as disclosed in WO 2012/025333, FIGS. 1 and 2, or to the distillation bottoms evaporator or to both the hydrogen peroxide feed evaporator and the distillation bottoms evaporator. The distillation column may comprise trays or packings or a combination of both and preferably comprises structured packings to minimize pressure drop in the column. The vapor compressor may be a mechanical compressor, preferably a one stage mechanical compressor and is most preferably a water ring pump. The vapor compressor may alternatively be a gas jet pump and is preferably a steam driven ejector. The distillation unit may further comprise a heat exchanger for transferring heat from the aqueous condensate to the dilute aqueous hydrogen peroxide solution which is fed to the distillation column. Preferably, the inlet of the heat delivery side of the heat exchanger is connected to an outlet for aqueous condensate on the hydrogen peroxide evaporator, the inlet of the heat uptake side of the heat exchanger is connected to a conduit receiving dilute aqueous hydrogen peroxide solution from the extraction column and the outlet of the heat uptake side of the heat exchanger is connected to the feed inlet of the distillation column.

The purification unit e) of the device of the invention comprises a bed of a cation exchange resin in its protonated form for purifying the aqueous condensate to provide a purified condensate. The cation exchange resin can be both a gel type resin or a macroporous resin and is preferably a strongly acidic cation exchange resin containing sulfonic acid groups. Most preferred are cross-linked sulfonated polystyrene cation exchange resins. The bed of a cation exchange resin preferably consists of essentially spherical resin particles which preferably have a diameter of from 0.1 to 2 mm, more preferably of from 0.5 to 1.0 mm. Suitable cation exchange resins shaped as spherical particles are commercially available. The bed of a cation exchange resin is preferably provided as a resin column with a resin bed having a length of from 0.1 to 10 m. The resin column preferably has an inlet below the resin bed for aqueous condensate to be purified and an outlet above the resin bed for purified condensate, in order to provide purification by an upward flow through the resin bed. The purification unit preferably also comprises a pressure relief valve limiting the pressure in the bed of a cation exchange resin. The pressure relief valve is preferably attached to a vessel containing the bed of a cation exchange resin at a location above the bed of a cation exchange resin. The vessel containing the bed of cation exchange resin may further be connected via a flush valve to a purge vessel located above the vessel containing the bed of cation exchange resin, and a temperature sensor may be placed inside the bed of cation exchange resin opening the flush valve when the temperature inside the bed of cation exchange resin exceeds a critical value. This allows flushing the vessel with water containing a hydrogen peroxide stabilizer when the temperature in the bed of cation exchange resin rises due to hydrogen peroxide decomposition.

The purification unit preferably comprises a first filter upstream of the bed of cation exchange resin. The first filter preferably comprises a filter medium having an average pore size of from 0.1 to 50 μm, more preferably from 1 to 50 μm. A filter backflush operated periodically or based on a pressure difference measurement across the filter may be used to prevent the filter from getting blocked by particles. Any filter medium can be used that is sufficiently stable to aqueous hydrogen peroxide and does not promote decomposition of hydrogen peroxide. Preferably, a filter medium made from aramide polymers, polyolefins, polyamides, fluorinated polymers, sintered metals or combinations thereof is used. Suitable filter media are commercially available from 3M and Pall. Most preferably, the filter medium is made from polypropylene or from the polyamide of 1,3-diaminobenzene and benzene-1,3-dicarboxylic acid available under the trade name Nomex®. The purification unit may additionally comprise a second filter downstream of the bed of cation exchange resin. The same filter media as used for the first filter may be used for this second filter.

The device of the invention preferably comprises an additional buffer vessel which is connected to the purification unit to receive the purified condensate. The buffer vessel can be connected to the extractor, passing purified condensate as aqueous extractant to the extractor, or to the distillation unit, passing purified condensate as a column reflux to the distillation column, or to a hydrogen peroxide dilution device, passing purified condensate as diluent to the hydrogen peroxide dilution device or to any combination of these apparatuses. The buffer vessel is preferably connected to the extraction column to provide the aqueous extractant. The device of the invention may also comprise a further buffer vessel for aqueous condensate between the distillation unit and the purification unit, as well as pumps for passing aqueous condensate from the distillation unit to the purification unit and for passing purified condensate from the purification unit to the extractor, the distillation column and/or a hydrogen peroxide dilution device.

The device of the invention preferably comprises devices for pressure release, such as openings or safety valves, on the purification unit and any buffer vessel connected to it, to prevent pressure build-up from decomposition of hydrogen peroxide contained in the aqueous condensate. In a preferred embodiment, the purification unit comprises a temperature sensor in the bed of cation exchange resin or downstream from the bed, a reservoir for an aqueous solution containing a peroxide stabilizer placed at a location above the resin bed, flush valves for flushing the resin bed with stabilizer from the reservoir, and a safety circuit opening the flush valves when the temperature detected by the temperature sensor exceeds a threshold value.

The FIGURE shows a preferred embodiment of the device and the process of the invention. Oxidized and extracted working solution (1) comprising an alkylanthraquinone and an alkyltetrahydroanthraquinone is hydrogenated in hydrogenator (2) with hydrogen (3) in the presence of a hydrogenation catalyst. The hydrogenated working solution is passed to an oxidizer (4) where it is oxidized with air (5). Off-gas (6) from the oxidizer is further treated for recovery of solvent vapor in a unit not shown in the FIGURE. The oxidized working solution is passed to a counter-current sieve tray extraction column (7), used as an extractor for extracting hydrogen peroxide, at a position near the bottom of the extraction column (7) and is extracted with an aqueous extractant (8) introduced at a position near the top of the extraction column (7). Extracted oxidized working solution (1) is obtained at the top of the extraction column (7) and recycled to the hydrogenator (2). The dilute aqueous hydrogen peroxide solution (9) provided by the extraction is obtained at the bottom of the extraction column (7) and is passed to a middle section of the distillation column (10) of a distillation unit for concentrating the aqueous hydrogen peroxide solution (9). The distillation unit comprises a falling film evaporator (11) as column reboiler which acts as hydrogen peroxide evaporator. The mixture of vapor and liquid generated in the column reboiler is passed to a separation vessel (12) equipped with a demister, and the separated vapor (13) is returned to the distillation column (10). The liquid separated in separation vessel (12) is recycled to the column reboiler and a part of it is withdrawn from the recycle as a concentrated aqueous hydrogen peroxide product (14). A stream of water (15) is introduced as column reflux near the top of the distillation column (10). Overhead vapor (16) from the distillation column (10) is compressed with a steam driven ejector (17), used as vapor compressor, and compressed vapor (18) is passed as heating medium to falling film evaporator (11). The aqueous condensate (19), obtained in the falling film evaporator (11) by condensing compressed vapor (18), is passed through a heat exchanger (20) for heating the dilute aqueous hydrogen peroxide solution (9) fed to the distillation column (10), and further to a first buffer vessel (21) of a purification unit. The aqueous condensate (19) is then passed through a first filter (22), a vessel containing a bed (23) of a cation exchange resin in its protonated form, and a second filter (24) to a second buffer vessel (25). The purified condensate (26), collected in the second buffer vessel (25), is passed as aqueous extractant (8) to the extraction column (7).

EXAMPLES

Example 1

Iron contents were determined photometrically with a Jenway UV/Vis Photometer 6300 at a wave length of 565 nm using iron test kit Merck Spectroquant® article no. 1.14761 and a cuvette of 100 mm width. The lower detection limit was determined as 0.02 mg/L by calibration measurements.

Condensate from a hydrogen peroxide production plant, which uses a steam driven ejector for vapor compression in the distillation unit for concentrating extracted hydrogen peroxide solution, was analyzed and found to contain 0.09 mg/l of dissolved iron. Using condensate with such a high content of dissolved iron as an extractant in the extraction step of an anthraquinone process will produce an aqueous hydrogen peroxide having reduced stability due to hydrogen peroxide decomposition initiated by the dissolved iron.

An aqueous solution containing 0.1 mg/L of dissolved iron was prepared by adding a standard solution containing 10 g/l of iron(III) in 0.5 mol/l nitric acid to high purity water. The solution was passed in upward flow through a glass column containing a bed of macroporous ion exchange resin LEWATIT® MonoPlus SP 112 H having a diameter of 28 mm and a height of 128 mm at flow rates of 2 l/h to 7 l/h. At all tested flow rates, the treated water leaving the ion exchange resin bed had an iron content below detection limit, i.e. of less than 0.02 mg/l.

Example 2

Example 1 was repeated with a solution containing 10 mg/l of dissolved iron at a flow rate of 3 l/h. The purified solution contained less than 0.02 mg/l. Higher iron contents were only determined after passing more than 200 l of the solution through the resin bed.

Example 3

A purification unit as shown in the FIGURE with reference signs (21) to (25) was installed in a commercial hydrogen peroxide production plant which uses the anthraquinone process and a steam driven ejector for vapor compression in the distillation unit for concentrating extracted hydrogen peroxide solution. The aqueous condensate from the hydrogen peroxide evaporator containing from 10 to 50 mg/l of hydrogen peroxide was passed in upstream through a bed of cation exchange resin LEWATIT® MonoPlus SP 112 H having a diameter of 145 mm and a height of 450 to 600 mm at flow rates of 45 l/h to 90 l/h and a temperature of from 30° C. to 50° C. The purified condensate was passed as extractant to the extractor for extracting hydrogen peroxide from oxidized working solution. The experiment was run for 105 days. Throughout this period, the purified condensate contained less than 10 µg/l of iron (analyzed by voltammetry or ICP-MS) and had a conductivity of less than 15 µS/cm. The purified condensate was recycled to the extraction unit for extracting hydrogen peroxide and did not lead to an increase in the decomposition rate of the concentrated aqueous hydrogen peroxide solution produced by the plant and thus the amount of waste water is reduced. This recycling of the condensed vapor steam with subsequent purification can save up to 3 m³/h of deionized water, compared to operating the plant without reuse of the aqueous condensate.

LIST OF REFERENCE SIGNS

1 Oxidized and extracted working solution as working solution
2 Hydrogenator
3 Hydrogen as gas comprising molecular hydrogen
4 Oxidizer
5 Air as gas comprising molecular oxygen
6 Off-gas
7 Sieve tray extraction column as extractor
8 Aqueous extractant
9 Dilute aqueous hydrogen peroxide solution
10 Distillation column
11 Falling film evaporator as hydrogen peroxide evaporator
12 Separation vessel
13 Vapor stream
14 Concentrated aqueous hydrogen peroxide solution
15 Water
16 Overhead vapor
17 Steam driven ejector as vapor compressor
18 Compressed vapor
19 Aqueous condensate
20 Heat exchanger
21 First buffer vessel
22 First filter
23 Bed of a cation exchange resin
24 Second filter
25 Second buffer vessel
26 Purified condensate

The invention claimed is:

1. A device for producing hydrogen peroxide by an anthraquinone process, comprising:
   a) a hydrogenator for hydrogenating a working solution comprising an alkylanthraquinone and/or an alkyltetrahydroanthraquinone and at least one water immiscible solvent for said alkylanthraquinone and/or alkyltetrahydroanthraquinone with a gas comprising molecular hydrogen in the presence of a hydrogenation catalyst to provide a hydrogenated working solution;
   b) an oxidizer for oxidizing the hydrogenated working solution with a gas, comprising molecular oxygen to provide an oxidized working solution containing dissolved hydrogen peroxide, said oxidizer being connected to said hydrogenator to receive said hydrogenated working solution;
   c) an extractor for extracting hydrogen peroxide with an aqueous extractant from oxidized working solution containing dissolved hydrogen peroxide to provide a dilute aqueous hydrogen peroxide solution, said extractor being connected to said oxidizer to receive said oxidized working solution containing dissolved hydrogen peroxide;
   d) a distillation unit for concentrating an aqueous hydrogen peroxide solution to provide a concentrated aqueous hydrogen peroxide solution and an aqueous condensate, said distillation unit comprising a hydrogen peroxide evaporator, a distillation column receiving vapor from said hydrogen peroxide evaporator and a vapor compressor receiving overhead vapor from said distillation column and passing compressed vapor as heating medium to said hydrogen peroxide evaporator, said distillation unit being connected to said extractor to receive said dilute aqueous hydrogen peroxide solution; and
   e) a purification unit comprising a bed of a cation exchange resin in its protonated form for purifying said aqueous condensate to provide a purified condensate, said purification unit being connected to said distillation unit to receive said aqueous condensate as feed and being connected to (i) said extractor, passing purified condensate as aqueous extractant to said extractor, or (ii) said distillation unit, passing purified condensate as a column reflux to said distillation column, or (iii) a hydrogen peroxide dilution device, passing purified condensate as diluent to the hydrogen peroxide dilution device, or (iv) any combination of (i) to (iii); and wherein said purification unit comprises a first filter upstream of said bed of cation exchange resin.

2. The device of claim 1, wherein the vapor compressor of said distillation unit is a steam driven ejector.

3. The device of claim 1, wherein the distillation unit comprises a falling film evaporator as hydrogen peroxide evaporator, a separation vessel horizontally partitioned by a demister, connected below the demister to the falling film evaporator to receive a vapor-liquid mixture provided by the hydrogen peroxide evaporator, a conduit connected to the separation vessel above the demister for passing vapor to the distillation column, and a recycle conduit for recycling liquid from the bottom of the separation vessel to the falling film evaporator.

4. The device of claim 1, wherein the cation exchange resin is a sulfonated polystyrene resin.

5. The device of claim 1, additionally comprising a buffer vessel connected to said purification unit to receive said purified condensate and connected to said extractor to provide said aqueous extractant.

6. The device of claim 1, wherein said purification unit comprises a second filter downstream of said bed of cation exchange resin.

7. The device of claim 1, comprising a heat exchanger transferring heat from said aqueous condensate to said dilute aqueous hydrogen peroxide solution.

8. A process for producing hydrogen peroxide by an anthraquinone process, comprising the steps of:
   a) hydrogenating a working solution comprising an alkylanthraquinone and/or an alkyltetrahydroanthraquinone and at least one solvent for said alkylanthraquinone and/or alkyltetrahydroanthraquinone with a gas comprising molecular hydrogen in the presence of a hydrogenation catalyst to provide a hydrogenated working solution;
   b) oxidizing hydrogenated working solution of step a) with a gas comprising molecular oxygen to provide an oxidized working solution containing dissolved hydrogen peroxide;
   c) extracting hydrogen peroxide from oxidized working solution of step b) with an aqueous extractant to provide a dilute aqueous hydrogen peroxide solution containing from 25 to 50% by weight hydrogen peroxide;
   d) concentrating dilute aqueous hydrogen peroxide solution of step c) in a distillation unit comprising a hydrogen peroxide evaporator, a distillation column receiving vapor from the hydrogen peroxide evaporator and a vapor compressor receiving overhead vapor from the distillation column and passing compressed vapor as heating medium to the hydrogen peroxide evaporator to provide a concentrated aqueous hydrogen peroxide solution, containing from 45 to 90% by weight hydrogen peroxide, and an aqueous condensate;

e) purifying aqueous condensate of step d) in a purification unit by passing it through a bed of a cation exchange resin in its protonated form to provide a purified condensate wherein the bed of cation exchange resin is replaced by fresh resin when the concentration of iron, nickel or chromium in said purified condensate increases to a value of more than 0.02 mg/l; and f) reusing purified condensate of step e) as (i) an aqueous extractant in extracting step c), (ii) a column reflux for the distillation column in concentrating step d), (iii) a diluent in a step of diluting an aqueous hydrogen peroxide solution, or (iv) in any combination of (i) to (iii).

9. The process of claim 8, wherein in step d), a steam driven ejector is used as vapor compressor.

10. The process of claim 8, wherein step e) comprises filtering the aqueous condensate of step d) before passing it over the bed of cation exchange resin.

11. The process of claim 8, wherein part of the purified condensate is passed to the top of the distillation column of step d) to provide a column reflux and the remainder is passed to extracting step c).

12. The process of claim 8, wherein extracted working solution of step c) is recycled to hydrogenating step a).

13. The process of claim 12, wherein the extracted working solution of step c) is dried before it is recycled to hydrogenating step a).

14. The device of claim 2, wherein the distillation unit comprises a falling film evaporator as hydrogen peroxide evaporator, a separation vessel horizontally partitioned by a demister, connected below the demister to the falling film evaporator to receive a vapor-liquid mixture provided by the hydrogen peroxide evaporator, a conduit connected to the separation vessel above the demister for passing vapor to the distillation column, and a recycle conduit for recycling liquid from the bottom of the separation vessel to the falling film evaporator.

15. The device of claim 14, wherein said purification unit comprises a first filter upstream of said bed of cation exchange resin.

16. The device of claim 15, wherein the cation exchange resin is a sulfonated polystyrene resin.

17. The device of claim 16, additionally comprising a buffer vessel connected to said purification unit to receive said purified condensate and connected to said extractor to provide said aqueous extractant.

18. The device of claim 17, comprising a heat exchanger transferring heat from said aqueous condensate to said dilute aqueous hydrogen peroxide solution.

19. A process for producing hydrogen peroxide by an anthraquinone process, wherein said process is performed using the device of claim 1.

20. The process of claim 19, wherein the purification unit of said device comprises a second filter downstream of said bed of cation exchange resin.

* * * * *